US011334480B2

(12) United States Patent
Lee et al.

(10) Patent No.: US 11,334,480 B2
(45) Date of Patent: May 17, 2022

(54) DATA STORAGE DEVICE AND NON-VOLATILE MEMORY CONTROL METHOD

(71) Applicant: Silicon Motion, Inc., Jhubei (TW)

(72) Inventors: Jie-Hao Lee, Zhubei (TW); Yi-Kang Chang, New Taipei (TW); Hsuan-Ping Lin, Taichung (TW)

(73) Assignee: SILICON MOTION, INC., Jhubei (TW)

(*) Notice: Subject to any disclaimer, the term of this patent is extended or adjusted under 35 U.S.C. 154(b) by 0 days.

(21) Appl. No.: 16/885,627

(22) Filed: May 28, 2020

(65) Prior Publication Data

US 2020/0409835 A1 Dec. 31, 2020

Related U.S. Application Data

(60) Provisional application No. 62/866,051, filed on Jun. 25, 2019.

(30) Foreign Application Priority Data

Oct. 16, 2019 (TW) .................................. 108137199

(51) Int. Cl.
*G06F 12/02* (2006.01)
*G06F 12/0811* (2016.01)
*G06F 9/30* (2018.01)
*G06F 12/0882* (2016.01)

(52) U.S. Cl.
CPC ...... *G06F 12/0246* (2013.01); *G06F 9/30189* (2013.01); *G06F 12/0253* (2013.01); *G06F 12/0811* (2013.01); *G06F 12/0882* (2013.01); *G06F 2212/7209* (2013.01)

(58) Field of Classification Search
CPC ............. G06F 12/0246; G06F 12/0253; G06F 2212/7205; G06F 12/0882; G06F 2212/7209; G06F 12/0811; G06F 9/30189
USPC ................................................. 711/154, 103
See application file for complete search history.

(56) References Cited

U.S. PATENT DOCUMENTS

| 5,136,592 | A | 8/1992 | Weng |
| 6,092,231 | A | 7/2000 | Sze |
| 6,606,682 | B1 | 8/2003 | Dang et al. |
| 8,245,101 | B2 | 8/2012 | Olbrich et al. |
| 8,533,384 | B2 | 9/2013 | Olbrich et al. |

(Continued)

FOREIGN PATENT DOCUMENTS

| TW | 201611007 A | 3/2016 |
| TW | I661307 B | 6/2019 |

OTHER PUBLICATIONS

Non-Final Office Action dated Apr. 1, 2021, issued in U.S. Appl. No. 16/774,207.

(Continued)

*Primary Examiner* — Hashem Farrokh
(74) *Attorney, Agent, or Firm* — McClure, Qualey & Rodack, LLP

(57) ABSTRACT

An efficient control technology for non-volatile memory is shown. A non-volatile memory provides a storage space that is divided into blocks. When programming the write data issued by the host to the non-volatile memory, the programming order of the blocks is recorded. Garbage collection is based on the recorded programming order.
Sequential data can be collected to the destination block in sequence.

20 Claims, 6 Drawing Sheets

(56) References Cited

U.S. PATENT DOCUMENTS

| | | |
|---|---|---|
| 8,904,090 B2 | 12/2014 | Baek et al. |
| 9,870,836 B2 * | 1/2018 | Ooneda .................. G11C 29/52 |
| 10,783,037 B2 | 9/2020 | Chang et al. |
| 10,789,130 B1 | 9/2020 | Horspool et al. |
| 2002/0165911 A1 | 11/2002 | Gabber et al. |
| 2007/0079103 A1 | 4/2007 | Mimatsu |
| 2009/0077312 A1 | 3/2009 | Miura |
| 2010/0250855 A1 | 9/2010 | Watanabe et al. |
| 2011/0072199 A1 | 3/2011 | Reiter et al. |
| 2011/0238629 A1 | 9/2011 | Post et al. |
| 2011/0320864 A1 | 12/2011 | Gower et al. |
| 2011/0320914 A1 | 12/2011 | Alves et al. |
| 2013/0191703 A1 | 7/2013 | Meaney et al. |
| 2014/0013182 A1 | 1/2014 | Cheng et al. |
| 2014/0108855 A1 | 4/2014 | Gopakumar et al. |
| 2014/0279941 A1 | 9/2014 | Atkisson |
| 2015/0169465 A1 | 6/2015 | Slepon |
| 2016/0078948 A1 | 3/2016 | Shirakawa |
| 2016/0098344 A1 | 4/2016 | Gorobets et al. |
| 2016/0098355 A1 | 4/2016 | Gorobets |
| 2016/0117252 A1 | 4/2016 | Thangaraj et al. |
| 2017/0308473 A1 | 10/2017 | Bassi |
| 2017/0371794 A1 * | 12/2017 | Kan ....................... G06F 3/0656 |
| 2018/0203627 A1 | 7/2018 | Gilda et al. |
| 2018/0275887 A1 * | 9/2018 | Yang ...................... G06F 3/0652 |
| 2018/0285258 A1 * | 10/2018 | Muchherla .............. G06F 3/061 |
| 2019/0004960 A1 | 1/2019 | Wang et al. |
| 2019/0026224 A1 * | 1/2019 | Koo .................... G06F 12/0253 |
| 2019/0108120 A1 * | 4/2019 | Kanno .................... G06F 3/064 |
| 2019/0155685 A1 | 5/2019 | Kim |
| 2019/0347006 A1 * | 11/2019 | Yeh ....................... G06F 3/0679 |
| 2020/0233757 A1 | 7/2020 | Ferreira et al. |
| 2020/0394099 A1 | 12/2020 | Lin et al. |
| 2020/0409856 A1 | 12/2020 | Navon et al. |

OTHER PUBLICATIONS

Non-Final Office Action dated Jun. 9, 2021, issued in U.S. Appl. No. 16/786,089.

Office Action dated Sep. 9, 2021 in U.S. Appl. No. 16/774,300.

* cited by examiner

DATA STORAGE DEVICE AND NON-VOLATILE MEMORY CONTROL METHOD

CROSS REFERENCE TO RELATED APPLICATIONS

This Application claims the benefit of U.S. Provisional Application No. 62/866,051, filed on Jun. 25, 2019, the entirety of which is incorporated by reference herein.

This Application also claims priority of Taiwan Patent Application No. 108137199, filed on Oct. 16, 2019, the entirety of which is incorporated by reference herein.

BACKGROUND OF THE INVENTION

Field of the Invention

The present invention is related to non-volatile memory control technologies.

Description of the Related Art

There are various forms of non-volatile memory (NVM) for long-term data storage, such as flash memory, magnetoresistive random access memory (RAM), ferroelectric RAM, resistive RAM, spin transfer torque-RAM (STT-RAM), and so on. These types of non-volatile memory may be used as the storage medium in a data storage device.

Non-volatile memory usually has special storage characteristics. In this technical field, control technologies based on the special storage characteristics of non-volatile memory are developed.

BRIEF SUMMARY OF THE INVENTION

An efficient control technology for non-volatile memory is proposed in the invention. The storage space of a non-volatile memory is further divided into blocks. When write data issued by a host is programmed into the non-volatile memory, the programming order of the blocks is recorded in the disclosure. Garbage collection performed based on the recorded programming order is presented in the disclosure.

A data storage device in accordance with an exemplary embodiment of the present invention comprises a non-volatile memory and a controller. The non-volatile memory comprises a storage space that is divided into blocks. The controller is configured to control the non-volatile memory. The controller records the programming order of the blocks when programming write data issued by a host to the non-volatile memory. Based on the programming order, the controller copies valid data of a first source block to a first destination block and then copies valid data of a second source block to the first destination block, wherein as recorded in the programming order the second source block was programmed after the first source block. After coping valid data from the first source block and the second source block to the first destination block, the controller releases the first source block and second source block to complete a first type of garbage collection.

In an exemplary embodiment, the controller programs the write data issued by the host to the non-volatile memory in a first storage mode and, through the first type of garbage collection, the write data is changed to be stored in the non-volatile memory in a second storage mode. The first source block and the second source block store data in the first storage mode. The first destination block stores data in the second storage mode.

In an exemplary embodiment, the controller performs the first type of garbage collection when the total number of spare blocks to be operated in the first storage mode is lower than a first threshold amount.

In an exemplary embodiment, the controller performs a second type of garbage collection when the total number of spare blocks to be operated in the second storage mode is lower than a second threshold amount. In the second type of garbage collection, the controller selects a third source block from blocks operated in the second storage mode based on valid page counts of the blocks operated in the second storage mode, copies valid data of the third source block to a second destination block that is operated in the second storage mode, and releases the third source block.

In an exemplary embodiment, when the host requests to update data of the first destination block, the controller programs new data to the non-volatile memory in the first storage mode, and invalidates old data in the first destination block and thereby the first destination block is released without the second type of garbage collection.

In an exemplary embodiment, the first storage mode is a single-level cell storage mode, and the second storage mode is a triple-level cell storage mode.

In an exemplary embodiment, the controller manages a table to record the programming order specifically for blocks programmed in the first storage mode.

In an exemplary embodiment, the data storage device further comprises a memory coupled to the controller. The controller dynamically updates the table in the memory.

In an exemplary embodiment, the controller seals the table to a system information block of the non-volatile memory.

In an exemplary embodiment, the controller programs end-of-block information at the end of each block programmed in the first storage mode, to link to a subsequently programmed block.

The aforementioned controller may be implemented in other architectures. The foregoing concept can be used to implement a non-volatile memory control method, which includes the following steps: when programming write data issued by a host to a non-volatile memory that comprises a plurality of blocks, recording the programming order of the blocks; based on the programming order, copying valid data of a first source block to a first destination block and then copying valid data of a second source block to the first destination block, wherein as recorded in the programming order the second source block was programmed after the first source block; and after coping valid data from the first source block and the second source block to the first destination block, releasing the first source block and second source block to complete a first type of garbage collection.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description shows exemplary embodiments of carrying out the invention. This description is made for the purpose of illustrating the general principles of the invention and should not be taken in a limiting sense. The scope of the invention is best determined by reference to the appended claims.

A non-volatile memory for long-term data retention may be a flash memory, a magnetoresistive random access memory (RAM), a ferroelectric RAM, a resistive RAM, a spin transfer torque-RAM (STT-RAM) and so on. The following discussion uses flash memory as an example.

Today's data storage devices often use flash memory as the storage medium for storing user data from the host. There are many types of data storage devices, including memory cards, universal serial bus (USB) flash devices, solid-state drives (SSDs), and so on. In another exemplary embodiment, a flash memory may be packaged with a controller to form a multiple-chip package called eMMC (embedded multimedia card).

A data storage device using a flash memory as a storage medium can be applied in a variety of electronic devices, including a smartphone, a wearable device, a tablet computer, a virtual reality device, etc. A calculation module of an electronic device may be regarded as a host that operates the data storage device equipped on the electronic device to access the flash memory within the data storage device.

A data center may be built with data storage devices using flash memories as the storage medium. For example, a server may operate an array of SSDs to form a data center. The server may be regarded as a host that operates the SSDs to access the flash memories within the SSDs.

Flash memory has its special storage characteristics which are described below. The host side distinguishes data by logical addresses (for example, logical block addresses LBAs). The following uses LBA as an example of a logical address unit for description. As for where the data is actually stored in the flash memory, it is managed by mapping information.

Figure 1:
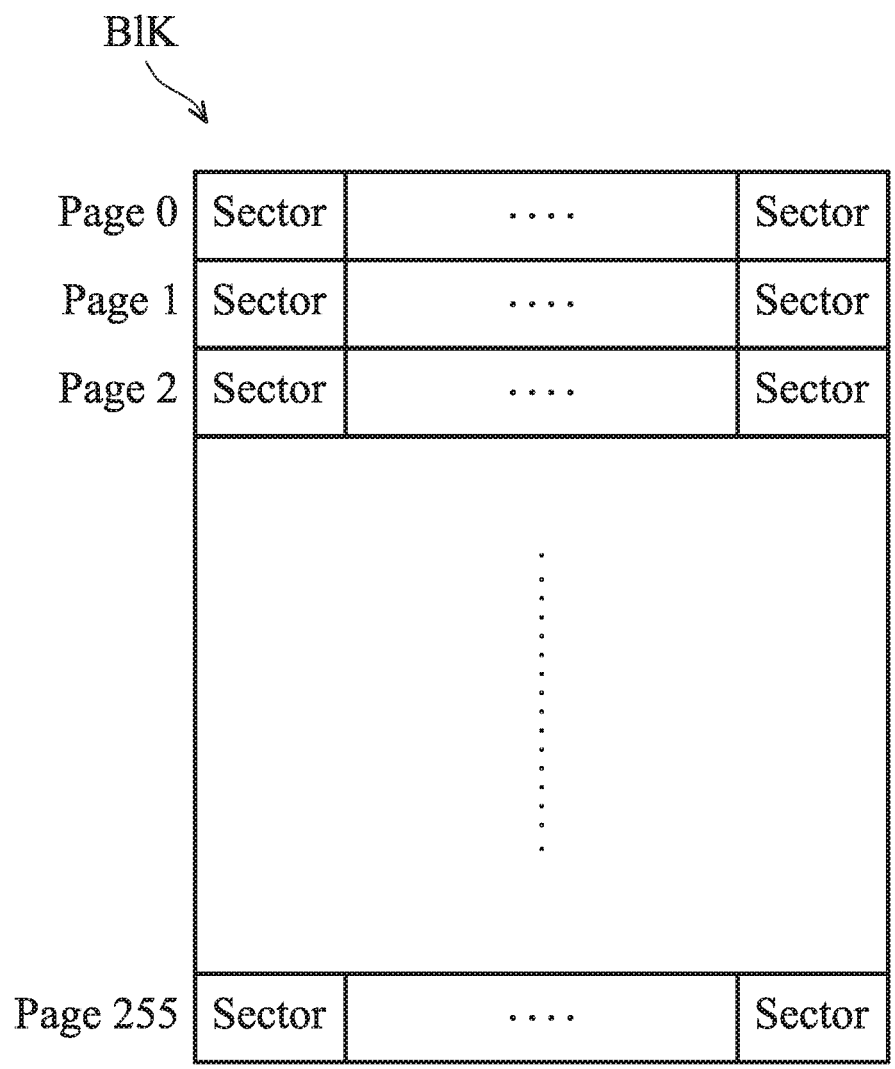
FIG. 1 illustrates the architecture of one block BLK.

The physical space of a flash memory is divided into a plurality of blocks. FIG. 1 illustrates the architecture of one block BLK, which includes a plurality of pages (e.g., page 0 to page 255). Each page includes a plurality of sectors (e.g., 32 sectors per page), and each sector may store 512 B user data. A single write may cover multiple sectors. In a 4 KB data management mode, each data unit covers 8 sectors (4 KB) and the 8 sectors are managed together. A 16 KB page stores four data units (32 sectors). One implementation is to sequentially program a block according to the page number (from low to high). In particular, data is not updated to the storage space of the old data. The new version of the data must be written into a spare space and the old data is invalidated. A block may only have sporadic valid data remained.

As data is continuously written into the spare space, the spare blocks are gradually consumed. When the number of spare blocks is insufficient (for example, less than a threshold amount), a garbage collection demand occurs. Sporadic valid data in a block is collected into another block (e.g., an active block) through garbage collection. Blocks with only invalid data remained is erased to be released as a spare block, and so that the number of spare blocks is increased to ensure the normal use of the data storage device.

One implementation of the garbage collection is to select a data block with a low valid page count as a source block. In this way, only a small amount of valid data needs to be moved. The source block can be quickly erased and released as a spare block. However, to choose the source block based on the valid page count has its disadvantages. For example, the data originally stored in the first source block and the second source block may be sequential in LBAs. After a period of time, there may be only sporadic valid data remained in the first source block or the second source block and garbage collection may be invoked. The logical continuity may be damaged when collecting the sporadic remained data to a destination block by garbage collection based on the valid page counts of the different blocks. The LBAs of the data collected to the destination block may be discontinuous, or in a random order. This result is not conducive to the data reading of sequential LBAs. The data reading performance of such a data storage device is low.

This invention proposes a scheme to solve the problem of data fragmentation. In the present invention, source blocks for garbage collection are selected from the data blocks based on their programming order. For a first block programmed earlier than a second block, the first block is selected as the source block in the first round of garbage collection and, after the valid data remained in the first block is collected to a destination block, the second block is selected as the source block in the second round of garbage collection to move the valid data remained in the second block to the destination block. In this manner, the data collected in the destination block maintains a high continuity degree of LBAs, which is conducive to sequential data reading. Specifically, when the sequential data collected in the destination block is updated, the whole destination block may be invalidated and released. No additional garbage collection procedure is needed to release the space of the destination block. The system resources are greatly saved.

In an exemplary embodiment, the flash memory is not limited to being programmed as single-level cells (SLCs). Some space may store data in multiple level cells, such as triple-level cells (TLCs), or quad-level cells (QLCs). An SLC stores one bit of data, a TLC stores three bits of data, and so on. To simplify the description, the following discussion regarding multiple level cells focuses on TLCs. The TLC techniques in the following discussion may be replaced by other multiple-level cell techniques.

Figure 2A:
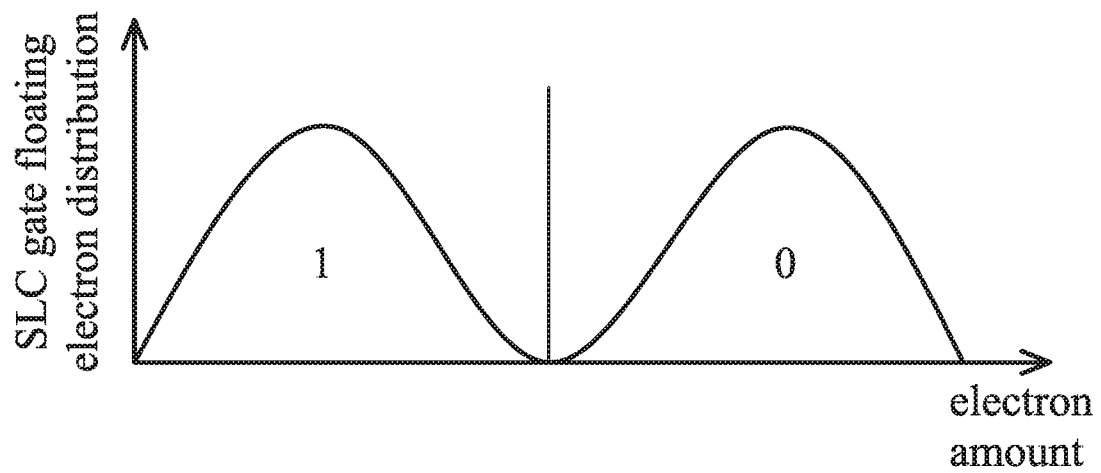
FIG. 2A and FIG. 2B respectively correspond to SLCs and TLCs, which show the distribution probability of gate floating electrons for the different logical levels.
Figure 2B:
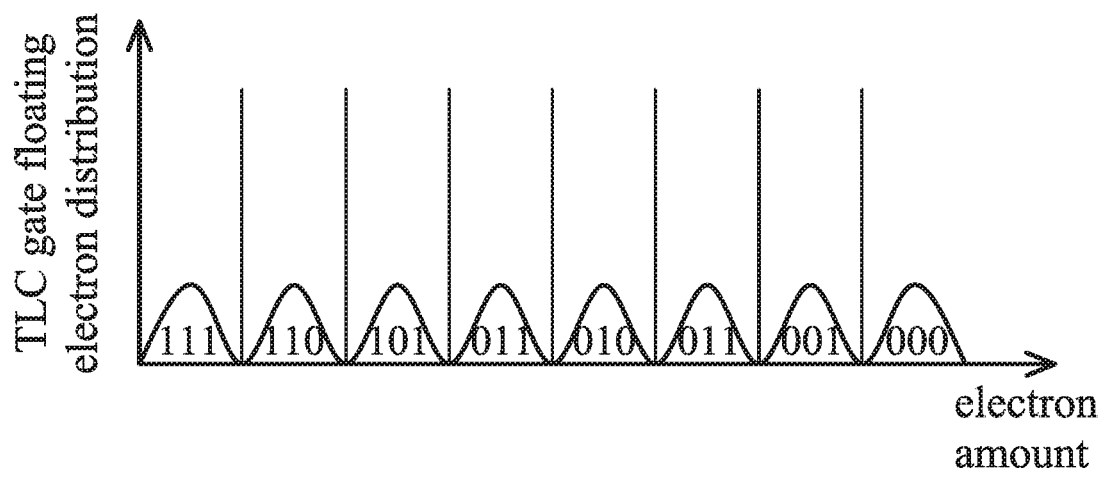

FIG. 2A and FIG. 2B respectively correspond to SLCs and TLCs, which show the distribution probability of gate floating electrons for the different logical levels. As shown, the logical level of a memory cell is determined according to its gate floating electron distribution. The logical boundary of SLCs is clearer than TLCs. SLCs have higher reliability, and faster writing speed. TLCs have advantages in storage capacity. For the pursuit of accuracy and speed, SLC blocks are the ideal storage target. For example, SLC blocks may be used to implement data caching. TLC blocks are used to increase storage density. For example, TLC blocks may be used for high density data storage. SLC data typically needs to be moved to TLCs for a higher storage capacity.

In an exemplary embodiment, TLC blocks may simulate the operations of SLC blocks. For example, in an SLC storage mode, the TLC blocks may be programmed as SLC blocks and read as SLC blocks. Data issued by a host may be programmed to spare TLC blocks operated in the SLC The mode and, after the programming, the TLC blocks should be regarded as SLC data blocks. When the amount of programmed data reaches a critical amount (for example, one third of the storage capacity of the data storage device), there is a garbage collection demand to move valid data from the SLC data blocks to the spare TLC blocks.

In an exemplary embodiment of the present invention, another type of garbage collection is performed when the amount of data programmed in the SLC storage mode exceeds a critical amount or the number of spare SLC blocks is lower than a critical number. Source blocks for garbage collection are selected from the SLC data blocks based on the programming order of the SLC data blocks. A spare TLC block may be selected as a destination block to collect the valid data of the source blocks. When finishing collecting data from the source blocks, the destination block may be transformed to a TLC data block. Because the source blocks are selected based on their programming order, sequential data collected from the source blocks to the destination block is not disarranged. The destination block stores data in sequential LBAs. It is beneficial to reading data of sequential LBAs. Specifically, when the sequential data collected in the destination block is updated, the whole destination block may be invalidated and released. No additional garbage collection procedure is needed to release the space of the destination block. The system resources are greatly saved.

Figure 3:
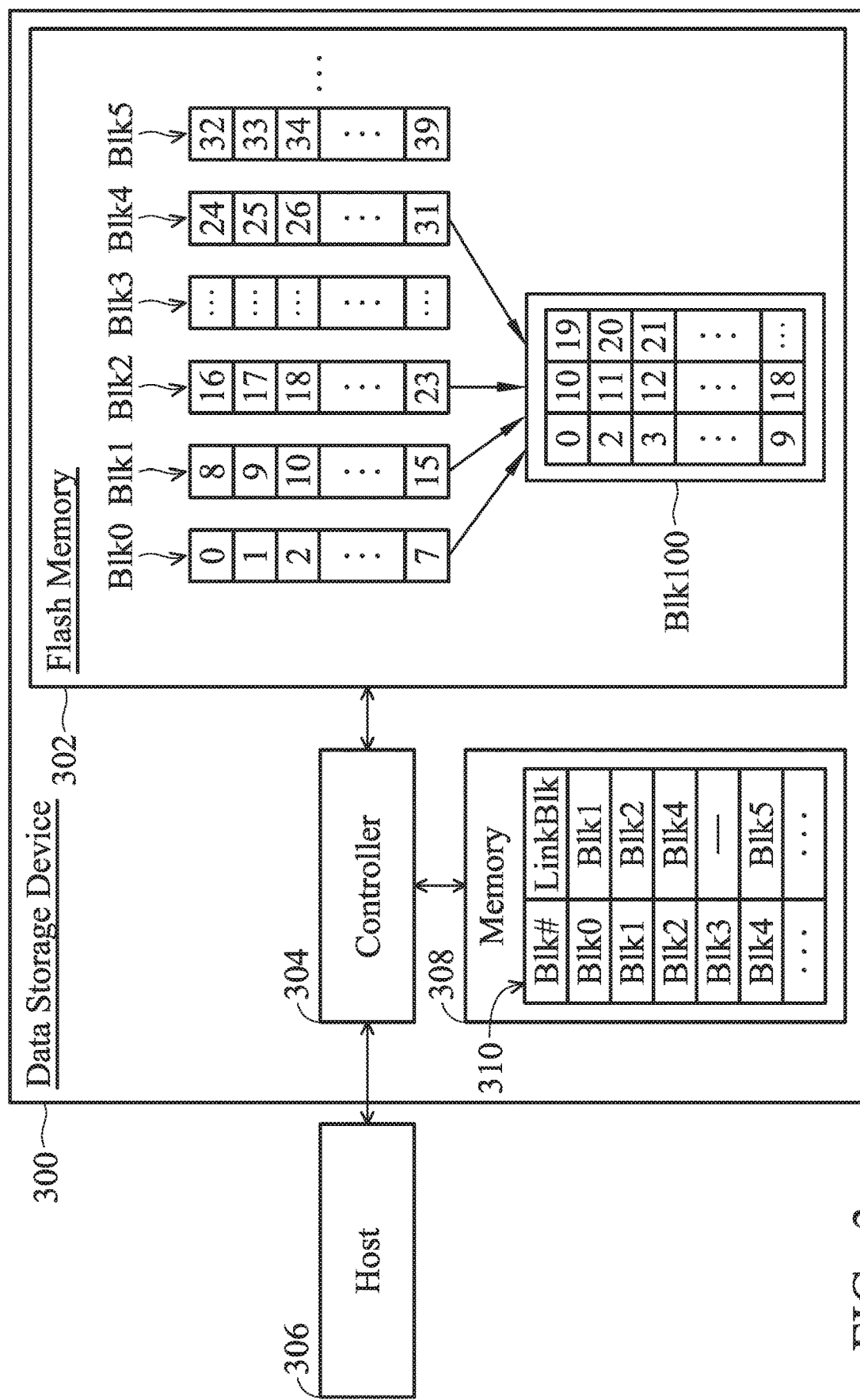
FIG. 3 is a block diagram illustrating a data storage device 300 in accordance with an exemplary embodiment of the present invention.

FIG. 3 is a block diagram illustrating a data storage device 300 in accordance with an exemplary embodiment of the present invention. The data storage device 300 uses a flash memory 302 as a storage medium, and designs a controller 304 for the flash memory 302. A host 306 operates the flash memory 302 through the controller 304.

In response to a write command from the host 306, the controller 304 operates the flash memory 302 in an SLC storage mode to program the write data to the spare SLC blocks of the flash memory 302. When data programming on a spare SLC block is finished, the spare SLC block is regarded as an SLC data block. The controller 304 may manage a table 310 on a memory (can be DRAM, SRAM, etc.) 308 to list the programming order of the SLC data blocks. As the data amount to be programmed to the flash memory 302 accumulates, there is not enough spare SLC blocks left or the amount of programmed data reaches a critical data amount. The controller 304 starts the garbage collection of the present invention. Source blocks for garbage collection are selected according to the programming order recorded in the table 310. Valid data scattered over the source blocks are collected to a destination block according to the programming order of the source blocks. The SLC data blocks whose valid data have been collected to the destination block may be erased and then released as spare SLC blocks.

As shown, the host 306 issues a write command for the programming of data of LBA # 0 ~# 39, and the controller 304 programs the data (of LBA # 0~# 39) to the flash memory 302 to be stored in SLC data blocks Blk0, Blk1, Blk2, Blk4, Blk5 . . . . The controller 304 updates the table 310 to record the subsequently programmed block (LinkBlk) of each block (BLK #). The table 310 shows that the programming order of the SLC data blocks is: Blk0→Blk1→Blk2→Blk4→Blk5.

When the garbage collection of the present invention starts, the controller 304 sequentially (in the programming order recorded in the table 310) selects the SLC data blocks Blk0, Blk1, Blk2, and Blk4 as the source blocks to be collected to the TLC data block Blk100. As shown in the figure, even if some data is invalidated on the SLC data blocks Blk0, Blk1, Blk2, and Blk4, and is not collected to the TLC data block Blk100, the data collected to the TLC data block Blk100 is still highly sequential in LBAs. The purpose of the present invention is achieved.

In addition to being temporarily stored in the memory 308, the table 310 may also be stored in the flash memory 302 for non-volatile storage. In an exemplary embodiment, the controller 304 records the subsequently programmed block LinkBlk into the EOB (end-of-block) information of each block Blk #, so that the data blocks are sequentially linked. In an exemplary embodiment, the controller 304 stores the table 310 in the system information blocks of the flash memory 302.

Figure 4:
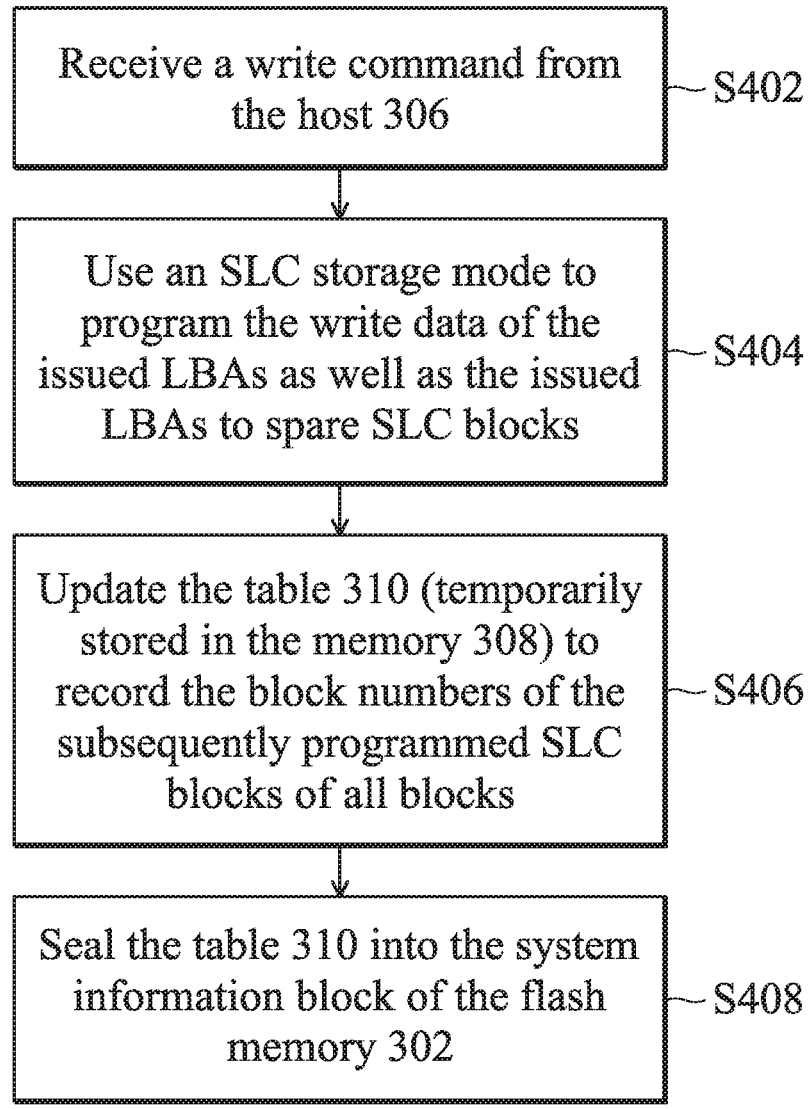
FIG. 4 is a flowchart illustrating the steps performed by the controller 304 in response to a write command in accordance with an exemplary embodiment of the present invention.

FIG. 4 is a flowchart illustrating the steps performed by the controller 304 in response to a write command in accordance with an exemplary embodiment of the present invention.

In step S402, the controller 304 receives a write command from the host 306. The write command indicates LBAs and write data corresponding to the LBAs.

In step S404, the controller 304 operates the flash memory 302 in an SLC storage mode to program the write data of the LBAs (as well as the LBAs) to spare SLC blocks.

In step S406, the controller 304 updates the table 310 in the memory 308 to record the block numbers of the subsequently programmed SLC blocks of all blocks.

In step S408, the controller 304 seals the table 310 into the system information block of the flash memory 302 for non-volatile storage.

Figure 5:
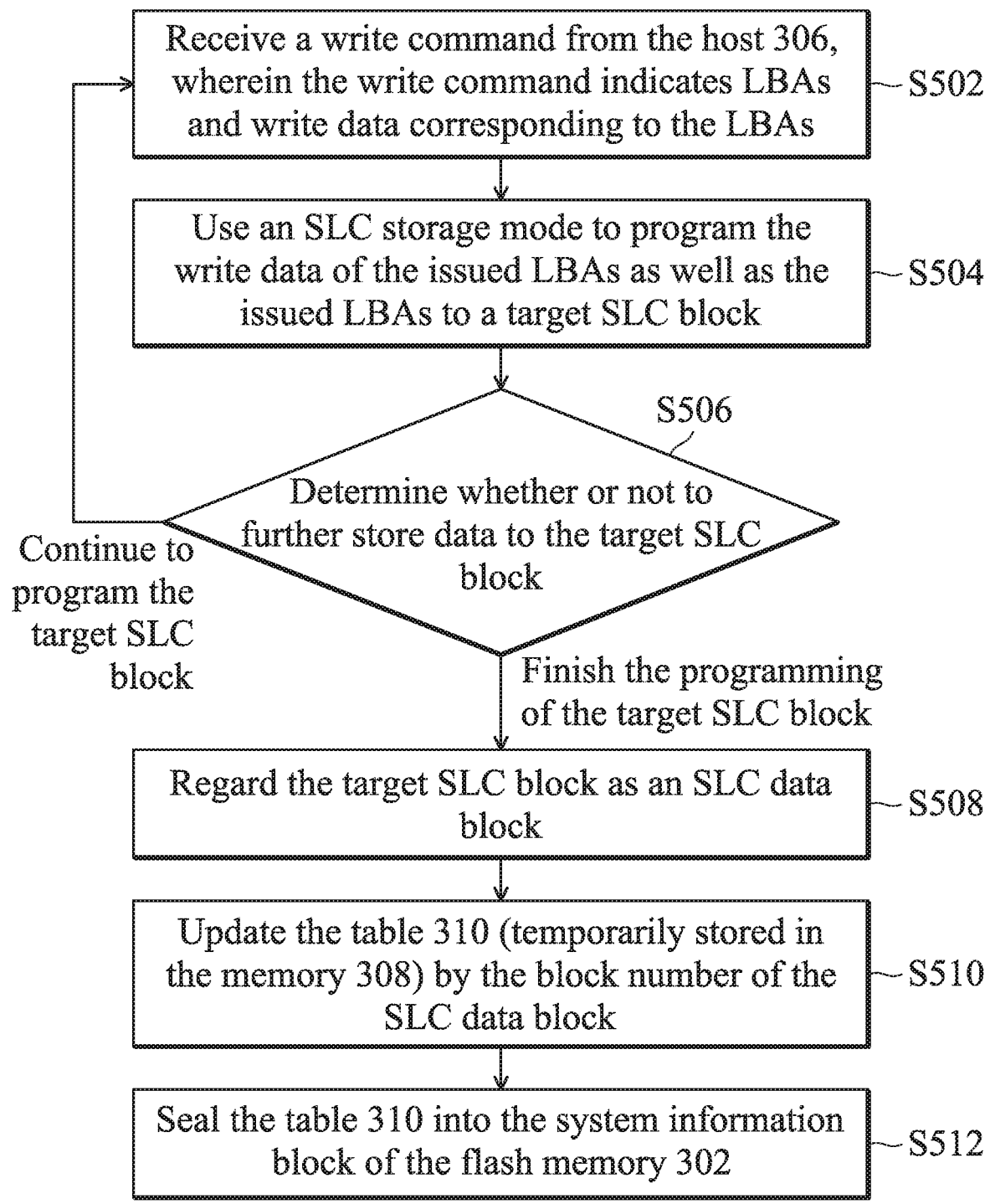
FIG. 5 is a flowchart illustrating the steps performed by the controller 304 in response to a write command in accordance with another exemplary embodiment of the present invention.

FIG. 5 is a flowchart illustrating the steps performed by the controller 304 in response to a write command in accordance with another exemplary embodiment of the present invention.

In step S502, the controller 304 receives a write command from the host 306. The write command indicates LBAs and write data corresponding to the LBAs.

In step S504, the controller 304 operates the flash memory 302 in an SLC storage mode to program the write data of the LBAs (as well as the LBAs) to a target SLC block that is a spare block.

In step S506, the controller 304 determines whether or not to further store data to the target SLC block. If yes, step S508 is performed, If not, step S502 is repeated. When the target SLC block is full of data, or an unexpected event such as power failure occurs suddenly, the controller 304 no longer programs data to the target SLC block.

In step S508, the controller 304 regards the target SLC block as an SLC data block.

In step S510, the controller 304 updates the table 310 in the memory 308 by the block number of the SLC data block.

In Step S512, the controller 304 seals the table 310 into the system information block of the flash memory 302 for non-volatile storage.

Figure 6:
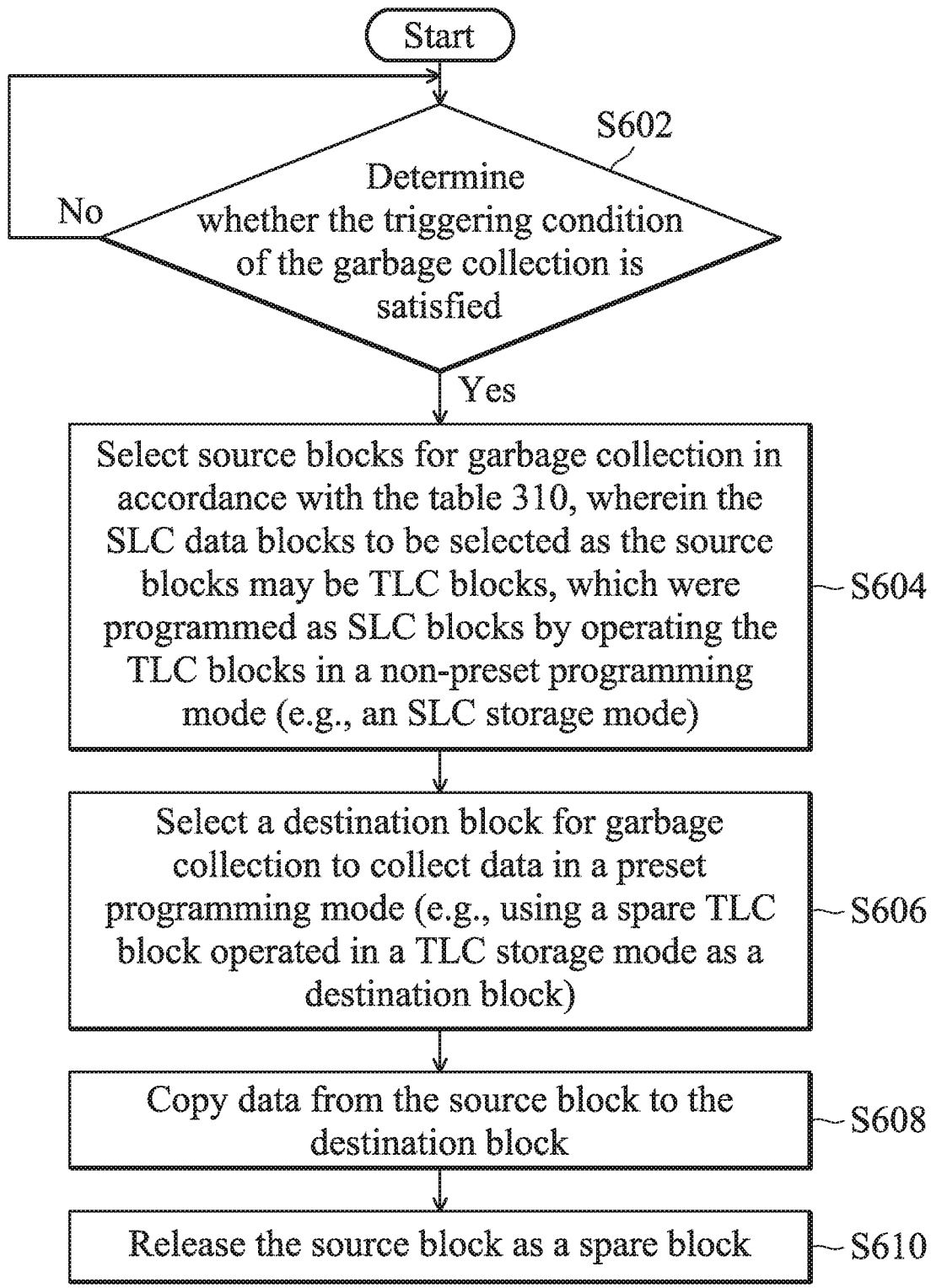
FIG. 6 is a flowchart illustrating steps of garbage collection performed by the controller 304 in accordance with an exemplary embodiment of the present invention.

FIG. 6 is a flowchart illustrating steps of garbage collection performed by the controller 304 in accordance with an exemplary embodiment of the present invention.

In step S602, the controller 304 determines whether the triggering condition of the garbage collection is satisfied, and if yes, executes step S604, and otherwise repeats step S602. For example, the garbage collection may be triggered when the number of spare SLC blocks is lower than a threshold block amount, or the data amount programmed into SLC blocks is greater than or equal to a threshold data amount.

In step S604, the controller 304 selects source blocks for garbage collection in accordance with the table 310. The source blocks may be selected from the SLC data blocks. The SLC data blocks may be TLC blocks, which were programmed as SLC blocks by operating the TLC blocks in a non-preset programming mode (e.g., an SLC storage mode).

In step S606, the controller 304 selects a destination block for garbage collection. The controller 304 may collect data to the destination block that is operated in a preset programming mode (e.g., using a TLC block operated in a TLC storage mode as a destination block). A spare TLC block may be selected as the destination block.

In step S608, the controller 304 copies data from the source block to the destination block.

In step S610, the controller 304 releases the source block as a spare block. After copying data from the source block to the destination block, only invalid data is remained in the source block. The controller 304 may change the invalidated SLC data block to a spare SLC block and thereby the number of spare SLC blocks is increased. The purpose of garbage collection is achieved.

In an exemplary embodiment, another type of garbage collection is performed, which starts when the number of spare TLC blocks is insufficient. At this time, a source block for garbage collection is selected based on the valid page count of each block. In this type of garbage collection, data is moved from a TLC source block to a TLC destination block, different from the aforementioned garbage collection that is performed based on a programming order of SLC blocks and collects data from an SLC source block to a TLC destination block. The data collection from SLC source blocks to a TLC destination block performed based on SLC block programming order is the first type of garbage collection. The data collection from TLC source blocks to a TLC destination block performed based on valid page counts is the second type of garbage collection.

In an exemplary embodiment, a non-volatile memory control method includes the following steps: when programming write data issued by a host to a non-volatile memory that comprises a plurality of blocks, recording the programming order of the blocks; based on the programming order, copying valid data of a first source block to a first destination block and then copying valid data of a second source block to the first destination block, wherein as recorded in the programming order the second source block was programmed after the first source block; and after coping valid data from the first source block and the second source block to the first destination block, releasing the first source block and second source block to complete a first type of garbage collection. This control method can be modified in various ways as described above.

The memory controller 304 controlling the flash memory 302 may be implemented in other architectures. Any techniques for performing garbage collection based on the programming order of the blocks are within the scope of the present invention. In some exemplary embodiments, control methods for non-volatile memory may be realized based on the foregoing concept.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A data storage device, comprising:
a non-volatile memory, comprising a storage space that is divided into blocks;
a controller, configured to control the non-volatile memory,
wherein:
the controller records a programming order of the blocks when programming write data issued by a host to the non-volatile memory;
based on the programming order, the controller copies valid data of a first source block to a first destination block and then copies valid data of a second source block to the first destination block;
as recorded in the programming order, the second source block was programmed after the first source block, and the first source block and the second source block are sequentially linked;
according to the programming order that shows the sequentially linked first and second source blocks, sequentially selecting the first and second source blocks to collect valid data of the first source block and the second source block to the first destination block is performed; and
after copying valid data from the first source block and the second source block to the first destination block, the controller releases the first source block and second source block to complete a first type of garbage collection.

2. The data storage device as claimed in claim 1, wherein:
the controller programs the write data issued by the host to the non-volatile memory in a first storage mode and, through the first type of garbage collection, the write data is changed to be stored in the non-volatile memory in a second storage mode;
the first source block and the second source block store data in the first storage mode; and
the first destination block stores data in the second storage mode.

3. The data storage device as claimed in claim 2, wherein:
the controller performs the first type of garbage collection when a total number of spare blocks to be operated in the first storage mode is lower than a first threshold amount.

4. The data storage device as claimed in claim 3, wherein:
the controller performs a second type of garbage collection when the total number of spare blocks to be operated in the second storage mode is lower than a second threshold amount; and
in the second type of garbage collection, the controller selects a third source block from blocks operated in the second storage mode based on valid page counts of the blocks operated in the second storage mode, copies valid data of the third source block to a second destination block that is operated in the second storage mode, and releases the third source block.

5. The data storage device as claimed in claim 4, wherein:
when the host requests to update data of the first destination block, the controller programs new data to the non-volatile memory in the first storage mode, and invalidates old data in the first destination block and thereby the first destination block is released without the second type of garbage collection.

6. The data storage device as claimed in claim 5, wherein:
the first storage mode is a single-level cell storage mode; and
the second storage mode is a triple-level cell storage mode.

7. The data storage device as claimed in claim 2, wherein:
the controller manages a table to record the programming order specifically for blocks programmed in the first storage mode.

8. The data storage device as claimed in claim 7, further comprising:
a memory, coupled to the controller,
wherein the controller dynamically updates the table in the memory.

9. The data storage device as claimed in claim 7, wherein:
the controller seals the table to a system information block of the non-volatile memory.

10. The data storage device as claimed in claim 2, further comprising:
the controller programs end-of-block information at the end of each block programmed in the first storage mode, to link to a subsequently programmed block.

11. A non-volatile memory control method, comprising:
when programming write data issued by a host to a non-volatile memory that comprises a plurality of blocks, recording a programming order of the blocks;
based on the programming order, copying valid data of a first source block to a first destination block and then copying valid data of a second source block to the first destination block; and
after copying valid data from the first source block and the second source block to the first destination block, releasing the first source block and second source block to complete a first type of garbage collection;
wherein:
as recorded in the programming order, the second source block was programmed after the first source block, and the first source block and the second source block are sequentially linked;
according to the programming order that shows the sequentially linked first and second source blocks, sequentially selecting the first and second source blocks to collect valid data of the first source block and the second source block to the first destination block is performed.

12. he non-volatile memory control method as claimed in claim 11, further comprising:
programming the write data issued by the host to the non-volatile memory in a first storage mode and, through the first type of garbage collection, changing the write data to be stored in the non-volatile memory in a second storage mode,
wherein:
the first source block and the second source block store data in the first storage mode; and
the first destination block stores data in the second storage mode.

13. The non-volatile memory control method as claimed in claim 12, further comprising:
performing the first type of garbage collection when the total number of spare blocks to be operated in the first storage mode is lower than a first threshold amount.

14. The non-volatile memory control method as claimed in claim 13, further comprising:
performing a second type of garbage collection when the total number of spare blocks to be operated in the second storage mode is lower than a second threshold amount; and
by the second type of garbage collection, selecting a third source block from blocks operated in the second storage mode based on valid page counts of the blocks operated in the second storage mode, copying valid data of the third source block to a second destination block that is operated in the second storage mode, and releasing the third source block.

15. The non-volatile memory control method as claimed in claim 14, further comprising:
when the host requests to update data of the first destination block, programming new data to the non-volatile memory in the first storage mode, and invalidating old data in the first destination block to release the first destination block without the second type of garbage collection.

16. The non-volatile memory control method as claimed in claim 15 wherein:
the first storage mode is a single-level cell storage mode; and
the second storage mode is a triple-level cell storage mode.

17. The non-volatile memory control method as claimed in claim 12, further comprising:
managing a table to record the programming order specifically for blocks programmed in the first storage mode.

18. The non-volatile memory control method as claimed in claim 17, further comprising:
providing a memory; and
dynamically updating the table in the memory.

19. The non-volatile memory control method as claimed in claim 17, further comprising:
sealing the table to a system information block of the non-volatile memory.

20. The non-volatile memory control method as claimed in claim 12, further comprising:
programming end-of-block information at the end of each block programmed in the first storage mode, to link to a subsequently programmed block.

* * * * *